(12) United States Patent
Kim et al.

(10) Patent No.: US 7,515,224 B2
(45) Date of Patent: Apr. 7, 2009

(54) DISPLAY SUBSTRATE, METHOD OF MANUFACTURING THE SAME AND DISPLAY DEVICE HAVING THE SAME

(75) Inventors: Jong-Seong Kim, Pohang-si (KR); Sung-Hwan Cho, Hwaseong-si (KR); Jae-Hyun Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 416 days.

(21) Appl. No.: 11/504,504

(22) Filed: Aug. 15, 2006

(65) Prior Publication Data

US 2007/0103624 A1   May 10, 2007

(30) Foreign Application Priority Data

Nov. 9, 2005   (KR) .................... 10-2005-0106793

(51) Int. Cl.
    *G02F 1/1335* (2006.01)
(52) U.S. Cl. ........................ 349/95; 349/114
(58) Field of Classification Search ............ 349/95, 349/113, 114
See application file for complete search history.

(56) References Cited

U.S. PATENT DOCUMENTS

| 4,790,632 A * | 12/1988 | Miyakawa et al. ............ 349/95 |
| 6,947,109 B2 * | 9/2005 | Lee ............................. 349/113 |
| 2006/0250546 A1 * | 11/2006 | Miyao et al. ................... 349/95 |

* cited by examiner

*Primary Examiner*—Hemang Sanghavi
(74) *Attorney, Agent, or Firm*—Cantor Colburn LLP

(57) ABSTRACT

A display substrate includes a transparent substrate, a pixel layer, an organic insulation layer, a transparent electrode and a reflective electrode. The pixel layer is formed on the transparent substrate and includes pixel parts having a matrix shape. The organic insulation layer is formed on the pixel layer and includes a microlens pattern having a depth of no less than about 1.5 micrometers ($\mu$m) formed on an upper portion of the organic insulation layer. The transparent electrode is formed on the organic insulation layer. The reflective electrode is partially formed on the transparent electrode to define a reflective region and a transmissive region.

19 Claims, 9 Drawing Sheets

US 7,515,224 B2

DISPLAY SUBSTRATE, METHOD OF MANUFACTURING THE SAME AND DISPLAY DEVICE HAVING THE SAME

This application claims priority to Korean Patent Application No. 2005-0106793 filed on Nov. 9, 2005, and all the benefits accruing therefrom under 35 U.S.C. §119, the contents of which are herein incorporated by reference in their entirety.

BACKGROUND OF THE INVENTION

1. Field of the Invention

Exemplary embodiments of the present invention relate to a display substrate, a method of manufacturing the display substrate and a display device having the display substrate. More particularly, exemplary embodiments of the present invention relate to a display substrate having an improved display quality, a method of manufacturing the display substrate and a display device having the display substrate.

2. Description of the Related Art

Among the various kinds of flat display devices that have been developed, a liquid crystal display device is widely employed in the industry because the liquid crystal display device is relatively thin and light rather than the other kinds of display devices. Also, the liquid crystal display device has been applied in a more expanded field because manufacturing the liquid crystal display device is relatively easy.

The liquid crystal display device is classified into a transmissive liquid crystal display device, a reflective liquid crystal display device and a transflective liquid crystal display device. The transmissive liquid crystal display device displays images using a light provided from a backlight assembly positioned at a rear side of a liquid crystal display panel. The reflective liquid crystal display device displays images using an external light provided from outside. The transflective liquid crystal apparatus operates in a transmissive display mode displaying images using a light provided from the backlight assembly where there is no external light source such as indoor environment. On the other hand, the transflective liquid crystal apparatus operates in a reflective display mode displaying images using a reflected light where there is external light source such as an outdoor environment.

In the liquid crystal display panel used for the reflective liquid crystal display device and the transflective liquid crystal display device, a microlens pattern is formed to increase a reflexibility of a natural light and to improve a visual angle.

The microlens pattern is formed by performing a deposition process of a photosensitive organic layer, and by performing an exposure process and a development process. Here, the photosensitive organic layer deposited by a spin coating generates an undesirable effect such as a thickness variation between a central portion and an edge portion of a glass substrate. When a crosslinking process such as the exposure process of the photosensitive organic layer, the development process of the photosensitive organic layer, etc., is performed, the microlens pattern may be deformed.

Because of the above-mentioned problems, controlling the microlens in an accurate way is difficult, thereby making it further difficult to increase a reflexibility of the liquid crystal display device.

BRIEF SUMMARY OF THE INVENTION

Exemplary embodiments provide a display substrate precisely controlling a microlens pattern to improve a reflexibility of a light.

Exemplary embodiments provide a method of manufacturing the above-mentioned display substrate.

Exemplary embodiments provide a display device having the above-mentioned display substrate.

An exemplary embodiment provides a display substrate. The display substrate includes a transparent substrate, a pixel layer, an organic insulation layer, a transparent electrode and a reflective electrode. The pixel layer is formed on the transparent substrate and the pixel layer includes pixel parts having a matrix shape. The organic insulation layer is formed on the pixel layer and includes a microlens pattern having a depth of no less than about 1.5 micrometers (μm) formed on an upper portion of the organic insulation layer. The transparent electrode is formed on the organic insulation layer. The reflective electrode is partially formed on the transparent electrode to define a reflective region and a transmissive region.

An exemplary embodiment provides a method of manufacturing a display substrate. In the method of manufacturing a display substrate, a pixel layer including pixel parts having a matrix shape is formed on a transparent substrate. An organic insulation layer including a microlens pattern having a depth of no less than about 1.5 μm, is formed on the pixel layer. A transparent electrode is formed on the organic insulation layer. A reflective electrode to define a reflective region and a transmissive region is formed on the transparent electrode. The organic insulation layer may be formed by using an organic insulation layer sheet.

An exemplary embodiment provides a display device. The display device includes a display substrate, an opposite substrate and a liquid crystal layer. The display substrate includes an organic insulation layer, a transparent electrode and a reflective electrode. The organic insulation layer includes a microlens pattern having a depth of no less than about 1.5 μm. The transparent electrode is formed on the organic insulation layer. The reflective electrode is partially formed on the transparent electrode to define a reflective region and a transmissive region. The opposite substrate faces the display substrate. The liquid crystal layer is disposed between the display substrate and the opposite substrate.

BRIEF DESCRIPTION OF THE DRAWINGS

The above and other features and advantages of the present invention will become more apparent by describing in detailed example embodiments thereof with reference to the accompanying drawings, in which.

DETAILED DESCRIPTION OF THE INVENTION

Figure 1:
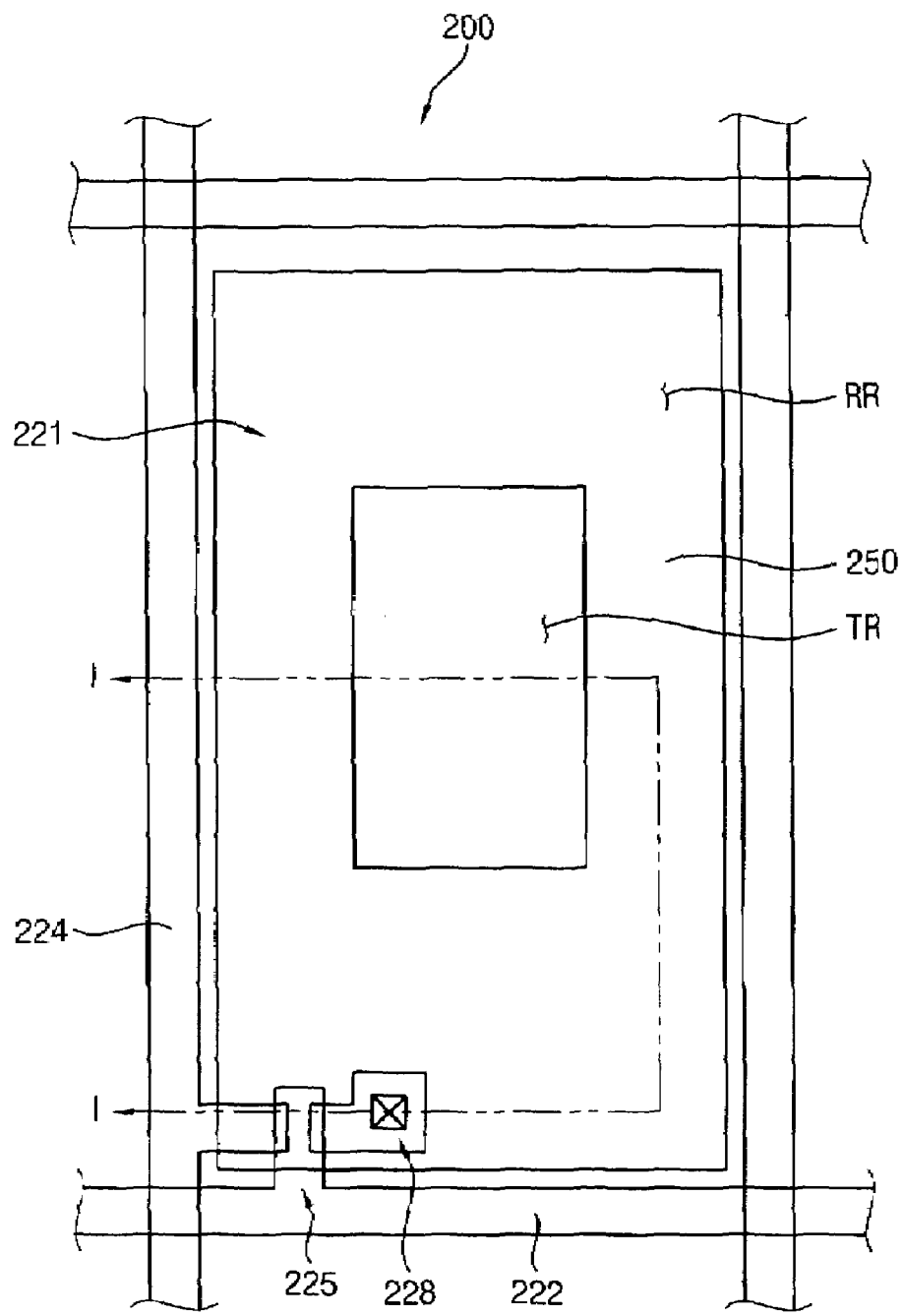
FIG. 1 is a plan view illustrating an exemplary embodiment of a display substrate in accordance with the present invention.

The present invention is described more fully hereinafter with reference to the accompanying drawings, in which example embodiments of the present invention are shown. The present invention may, however, be embodied in many different forms and should not be construed as limited to the example embodiments set forth herein. Rather, these embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on" or "connected to" another element or layer, it can be directly on, connected to the other element or layer or intervening elements or layers may be present. In contrast, when an element is referred to as being "directly on" or "directly connected to" another element or layer, there are no intervening elements or layers present. Like reference numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" relative to other elements or features would then be oriented "upper" relative to the other elements or features. Thus, the example term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprises" and/ or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the present invention are described herein with reference to cross-section illustrations that are schematic illustrations of idealized embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
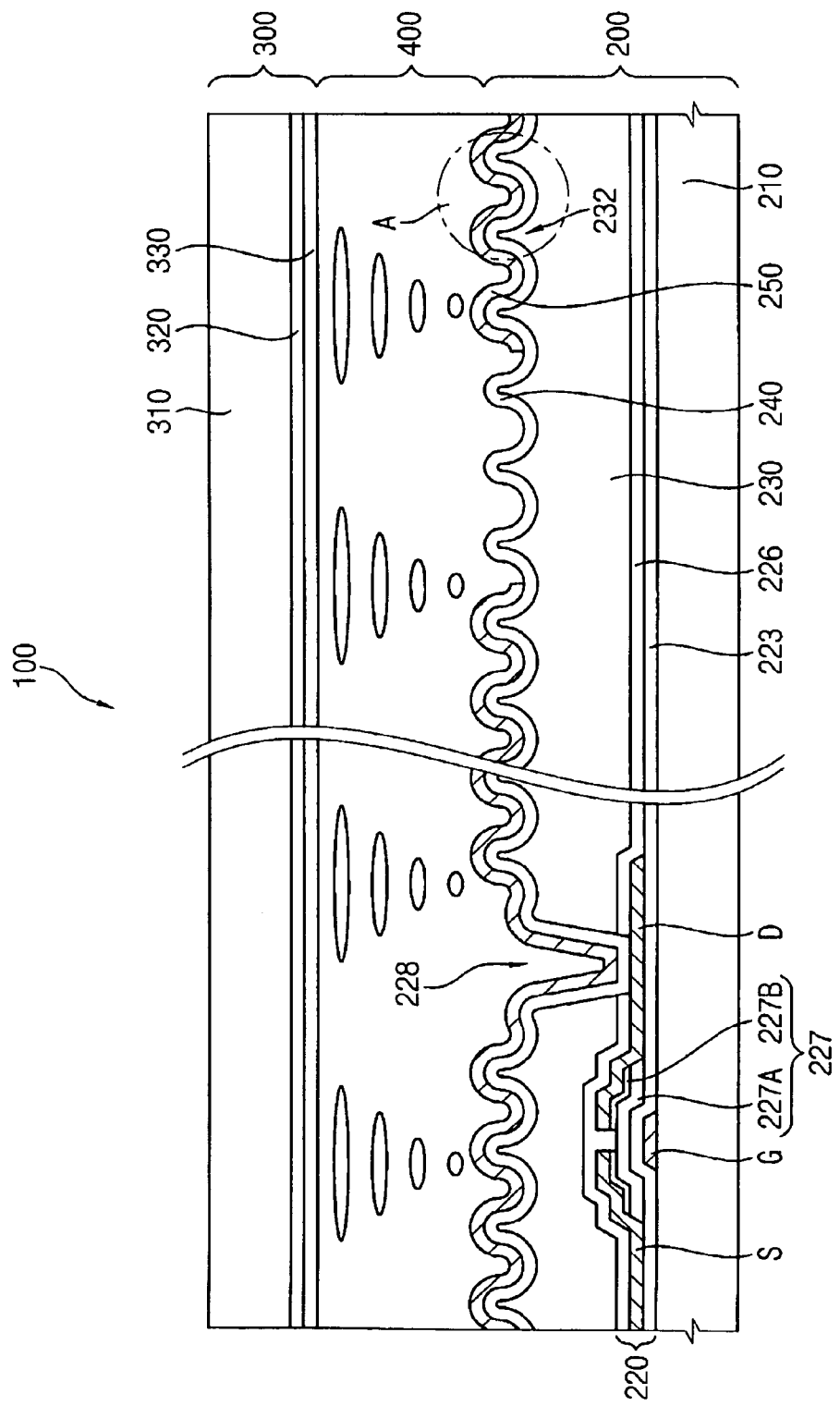
FIG. 2 is a cross-sectional view illustrating the display device taken along line I-I' in FIG. 1.

FIG. 1 is a plan view illustrating an exemplary embodiment of a display substrate of the present invention. FIG. 2 is a cross-sectional view illustrating the display device taken along line I-I' in FIG. 1.

Referring to FIGS. 1 and 2, a display device 100 includes a display substrate 200, a opposite substrate 300 facing the display substrate 200 and a liquid crystal layer 400 disposed between the display substrate 200 and the opposite substrate 300.

The display substrate 200 includes a reflection region RR and a transmissive region TR. In the reflection region RR, a natural light incident from an upper side of the display device 100 is reflected. In the transmissive region TR, a backlight incident from a lower side of the display device 100 is transmitted.

The display substrate 200 includes a transparent substrate 210, a pixel layer 220, an organic insulation layer 230, a transparent electrode 240 and a reflective electrode 250.

The transparent substrate 210 may include a transparent material transmitting a light. In one exemplary embodiment, the transparent substrate 210 includes glass.

The pixel layer 220 is formed on the transparent substrate 210. The pixel layer 220 includes pixel parts 221 arranged on the transparent substrate 210 in substantially a matrix shape.

The pixel layer 220 includes gate lines 222, a gate insulation layer 223, data lines 224, a thin-film transistor 225 and a passivation layer 226.

The gate lines 222 are formed on the transparent substrate 210 to define an upper side and a lower side of the pixel part 221 in FIG. 1.

The gate insulation layer 223 is formed on the transparent substrate 210 to cover the gate lines 222. In one exemplary embodiment, the gate insulation layer 223 includes a silicon nitride layer or a silicon oxide layer.

The data lines 224 are formed on the gate insulation layer 223 to define a left side and a right side of the pixel part 221 in FIG. 2.

The thin-film transistor 225 is connected to the gate lines 222 and the data lines 224, and is formed in the pixel part 221. The thin-film transistor 225 applies an image signal to the transparent electrode 240 responding to a scan signal transmitted through the gate lines 222.

The thin-film transistor 225 includes a gate electrode G, an active layer 227, a source electrode S and a drain electrode D.

The gate electrode G is connected to the gate line 222. The gate electrode G serves as a gate terminal of the thin-film transistor 225.

The active layer 227 is formed on the gate insulation layer 223, corresponding in location and/or dimension to the gate electrode G. The active layer 227 includes a semiconductor layer 227A and an ohmic contact layer 227B. In exemplary embodiments, the semiconductor layer 227A may include amorphous silicon. The ohmic contact layer 227B may include amorphous silicon heavily doped with n-type impurities.

The source electrode S is connected to the data line 224. The source electrode S is formed to extend to an upper portion of the active layer 227. The source electrode S serves as a source terminal of the thin-film transistor 225.

The drain electrode D is formed on the active layer 227 and spaced apart from the source electrode S. The drain electrode D serves as a drain terminal of the thin-film transistor 225. The drain electrode D is connected to the transparent electrode 240 through a contact hole 228. The contact hole 228 is formed through the passivation layer 226 and the organic insulation layer 230.

The source electrode S and the drain electrode D are disposed on the active layer 227 and spaced apart from each other. A channel layer of the thin-film transistor 225 is defined by a distance between the source electrode S and the drain electrode D.

The passivation layer 226 is formed on the gate insulation layer 223 where the date lines 224 and the thin-film transistor 225 are formed. The passivation layer 226 covers the date lines 224 and the thin-film transistor 225. In one exemplary embodiment, the passivation layer 226 includes a silicon nitride layer or a silicon oxide layer.

The organic insulation layer 230 is formed on the pixel layer 220. The contact hole 228 for exposing the drain electrode D of the thin-film transistor 225 is formed through the organic insulation layer 230 and the passivation layer 226.

A microlens pattern 232 is formed on an upper portion of the organic insulation layer 230 to increase a reflexibility of a light reflected by the reflective electrode 250 and to improve a visual angle.

Figure 3:
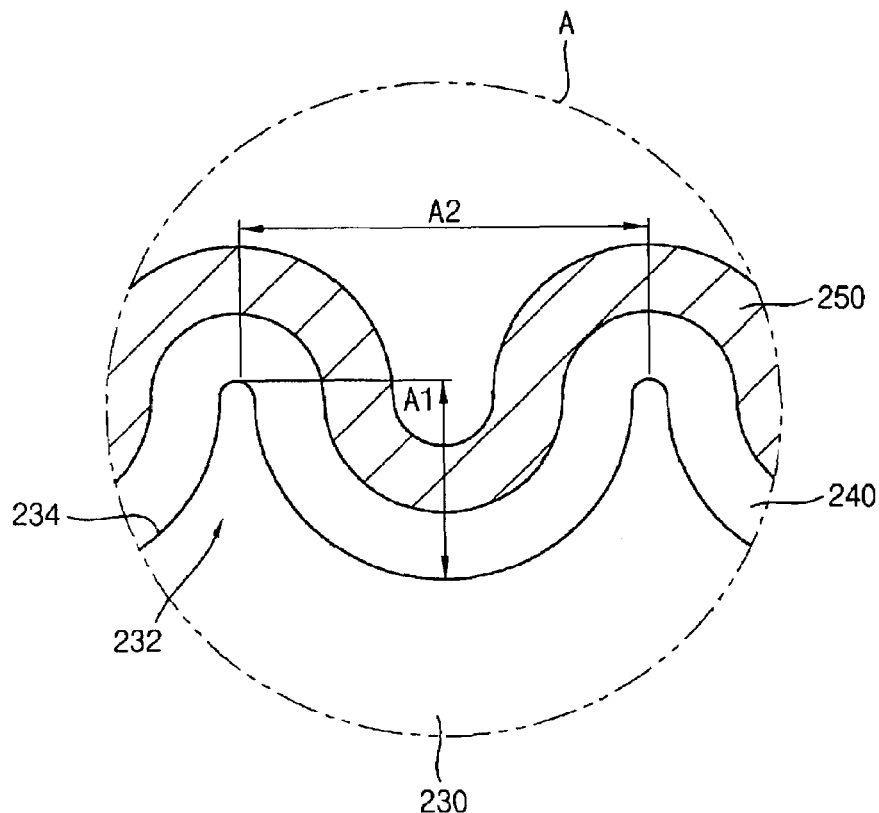
FIG. 3 is an enlarged cross-sectional view illustrating portion "A" in FIG. 2.

FIG. 3 is an enlarged cross-sectional view illustrating portion "A" in FIG. 2.

Referring to FIG. 3, the microlens pattern 232 includes microlenses 234 having substantially concave lens shapes. The microlenses 234 are arranged to be conformal with each other by a uniform interval. In alternative exemplary embodiments, the microlenses 234 may have convex lens shapes.

The reflexibility of a light incident from outside is affected by a depth A1 of the microlens pattern 231 and a diameter A2 of the microlens 234. The reflexibility of a light incident from the outside is most affected by the depth A1 of the microlens pattern 231.

Figure 4:
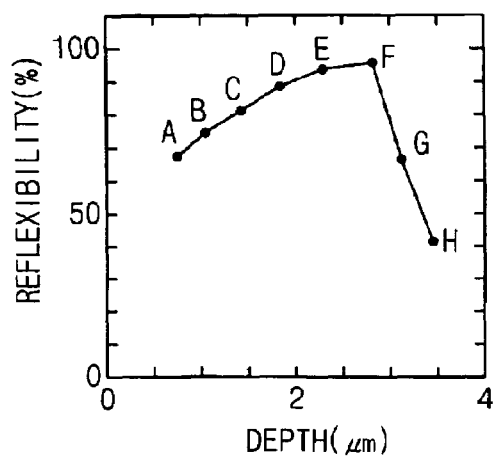
FIG. 4 is a simulation graph illustrating an exemplary embodiment of a reflexibility of a light according to a depth A1 of a microlens pattern 232 using an apparatus measuring an integrating sphere reflexibility.

FIG. 4 is a simulation graph illustrating an exemplary embodiment of a reflexibility of a light according to a depth A1 of the microlens pattern 232 using an apparatus measuring an integrating sphere reflexibility. In FIG. 4, a point A indicates a depth of 0.8 micrometers ($\mu m$) in the microlens pattern, a point B indicates a depth of 1.1 $\mu m$, a point C indicates a depth of 1.4 $\mu m$, a point D indicates a depth of 1.8 $\mu m$, a point E indicates a depth of 2.3 $\mu m$, a point F indicates a depth of 2.8 $\mu m$, a point G indicates a depth of 3.1 $\mu m$ and a point H indicates a depth of 3.5 $\mu m$.

Referring to FIGS. 3 and 4, when fixing the diameter A2 of the microlens 234 to a length of about 13.6 $\mu m$ and performing a simulation using the apparatus measuring an integrating sphere by varying the depth A1 of the microlens pattern 232, the reflexibility increases from the point A to the point F, and then the reflexibility abruptly decreases from the point F to the point H. As the depth A1 of the microlens pattern 232 increases from a depth of 0.8 $\mu m$ at point A to a depth of 2.8 $\mu m$ at point F, the reflexibility also increases. Meanwhile, as the depth A1 of the microlens pattern 232 increases over a depth of 2.8 $\mu m$, the reflexibility decreases. In particular, when the depth A1 of the microlens pattern 232 is in a range of about 1.5 $\mu m$ to 2.8 $\mu m$, the reflexibility is no less than about 80%.

Advantageously, when the depth A1 of the microlens pattern 232 is formed in a range of about 1.5 $\mu m$ to about 2.8 $\mu m$, the reflexibility of a natural light incident from outside may be improved.

Referring again to FIGS. 1-3, the transparent electrode 240 is formed on the organic insulation layer 230. The transparent electrode 240 is formed on the organic insulation electrode 230 corresponding to each pixel part 221. The transparent electrode 240 is electrically connected to the drain electrode D through the contact hole 228 that is formed through the organic insulation layer 230 and the passivation layer 226.

The transparent electrode 240 may include a transparent conductive material transmitting a light. In one exemplary embodiment, the transparent electrode 240 includes indium zinc oxide ("IZO") or indium tin oxide ("ITO").

The reflective electrode 250 is formed on the transparent electrode 240. The reflective electrode 250 may include a conductive material having a high reflexibility of a light to reflect a light. In exemplary embodiments, the reflective electrode 250 includes a single reflective layer or a double reflective layer. In one exemplary embodiment, the single reflective layer includes an aluminum niodium layer. In another exemplary embodiment, the double reflective layer includes an aluminum niodium layer and a molybdenum tungsten layer.

The reflective electrode 250 is partially formed on the transparent electrode 240 to define the reflection region RR and the transmissive region TR. The reflective region RR is a region where the reflective electrode 250 exists and the transmissive region TR is a region where the reflective electrode 250 is removed and the transparent electrode 240 is exposed. The transmissive region TR provides a light for displaying images by transmitting a backlight incident from a lower side of the display device. The reflective region RR is a region to provide a light for displaying images by reflecting a natural light incident from an upper side of the display device.

The transparent electrode 240 and the reflective electrode 250 are substantially uniformly formed on the organic insulation layer 230 so that the transparent electrode 240 and the reflective electrode 250 have substantially the same surface construction or profile as that of the organic insulation layer 230. The reflective electrode 250 has substantially the same depth as that of the microlens pattern 232 of the organic insulation layer 230.

Referring to FIG. 2, he opposite substrate 300 includes a transparent substrate 310, a color filter layer 320 and a common electrode 330.

The transparent substrate 310 may include a transparent material to transmit a light. In one exemplary embodiment, the transparent substrate 310 includes glass.

The color filter layer 320 is formed on a surface of the transparent substrate 310 facing the display substrate 200. The color filter layer 320 may include color pixels such as red, green, blue, etc. to realize color.

In an alternative exemplary embodiment, the color filter layer 320 may be formed on the display substrate 200.

The common electrode 330 is formed on the color filter layer 320 to face the display substrate 200. The common electrode 330 may include a transparent conductive material to transmit a light. In one exemplary embodiment, the common electrode 330 includes indium zinc oxide or indium tin oxide.

The liquid crystal layer 400 has a structure whereby liquid crystals having an optical and electrical property such as anisotropic refractive index, anisotropic permittivity, etc. are regularly arranged in the liquid crystal layer 400. The liquid crystal arrangement in the liquid crystal layer 400 is changed by an electric field applied between the transparent electrode 240 and the common electrode 330, thereby controlling a transmittance of a light.

In the illustrated exemplary embodiment, the organic insulation layer 230 having the microlens pattern 232 may be formed by an organic insulation layer sheet.

Figure 5:
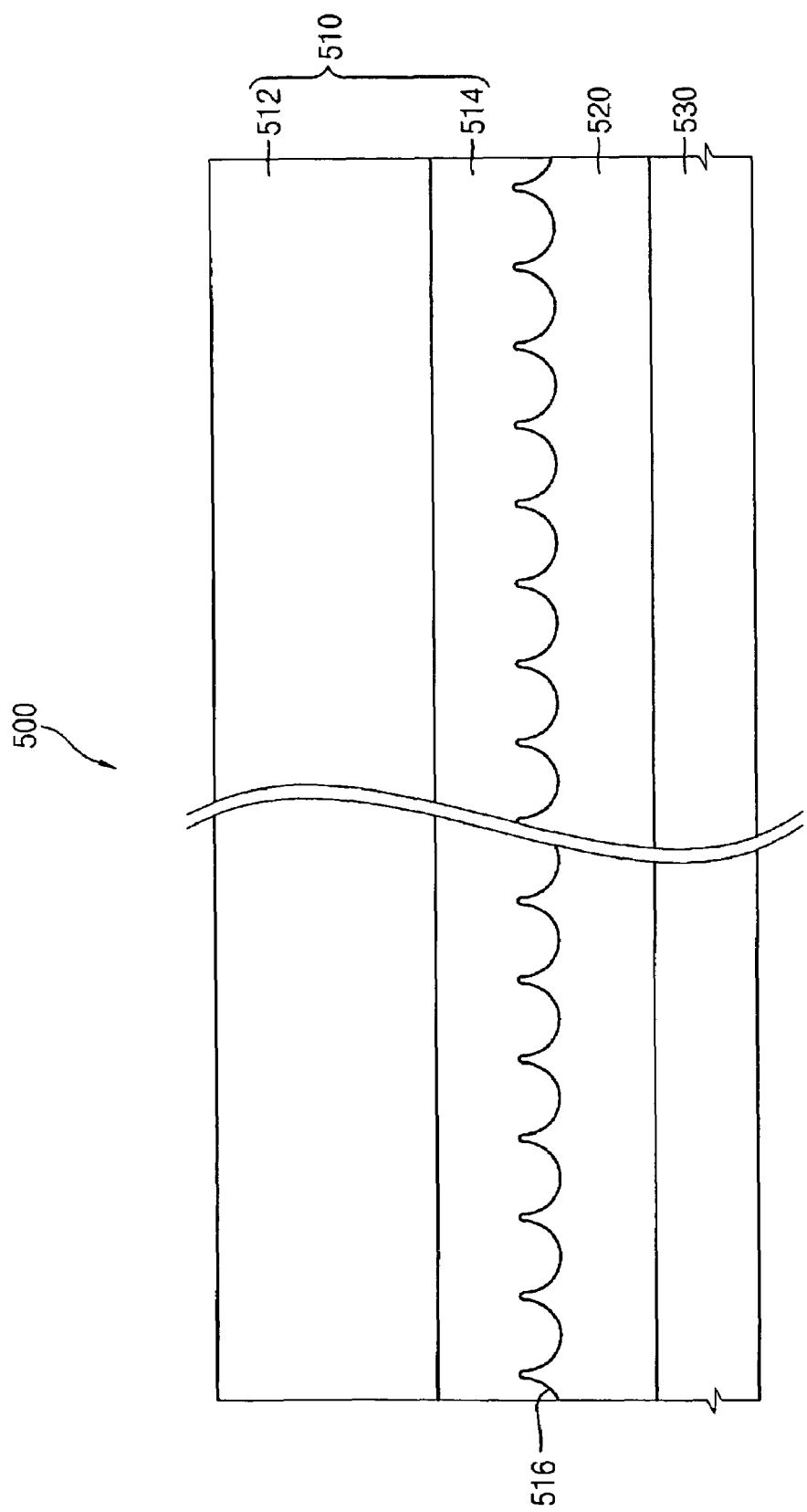
FIG. 5 is a cross-sectional view illustrating an exemplary embodiment of an organic insulation layer sheet to form an organic insulation layer in FIG. 2.
Figure 6:
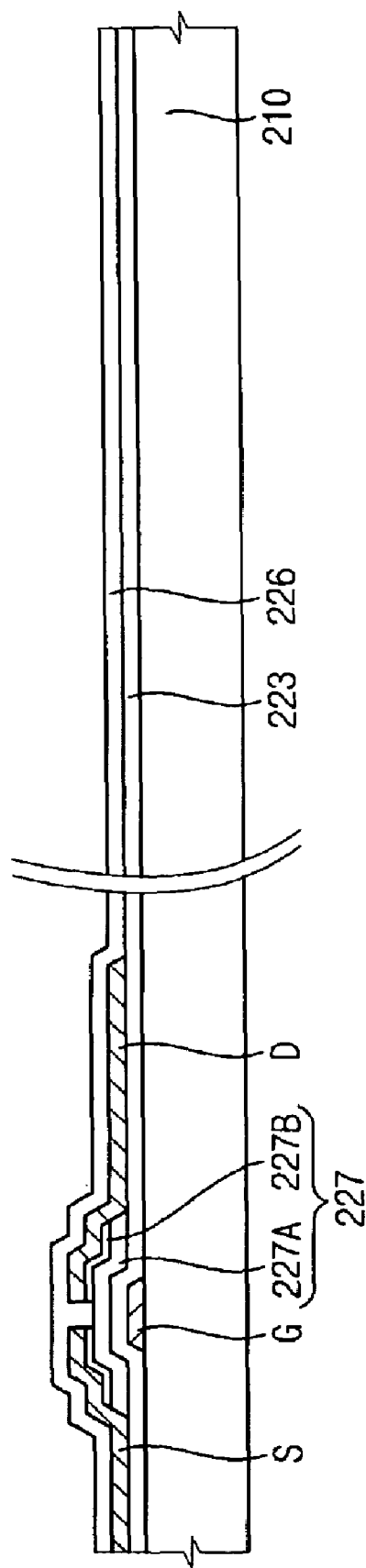
FIGS. 6 to 10 are cross-sectional views illustrating an exemplary embodiment of a method of manufacturing a display substrate in accordance with the present invention.

FIG. 5 is a cross-sectional view illustrating an exemplary embodiment of the organic insulation layer sheet to form the organic insulation layer 230 in FIG. 2.

Referring to FIG. 5, an organic insulation layer sheet 500 includes a base layer 510, an organic insulation layer 520 and a cover layer 530.

The base layer 510 includes a base film 512 and a pattern layer 514. In one exemplary embodiment, the base film 512 includes polyethylene terephthalate and is formed to have a thickness of about 50 μm. In one exemplary embodiment, the pattern layer 514 includes acryl-based resin and is formed to have a thickness of about 4.5 μm. An embossing pattern 516 corresponding to the microlens pattern 232 illustrated in FIG. 2 is formed on the pattern layer 514. The embossing pattern 516 has a convex lens shape and the embossing pattern 516 is formed to have a height of no less than about 1.5 μm. In one exemplary embodiment, the embossing pattern 516 is formed to have a height in a range of about 1.5 μm to about 2.8 μm.

The organic insulation layer 520 is formed on the pattern layer 514. In one exemplary embodiment, the organic insulation layer 520 includes acryl-based photosensitive resin and the organic insulation layer 520 is formed to have a thickness of about 2.3 μm. The organic insulation layer 520 is transcribed by the embossing pattern 516 of the pattern layer 514 and has a structure that microlenses having concave lens shapes are formed on the organic insulation layer 520. The desired shape of the organic insulation layer may be accurately formed by realizing a shape of the organic insulation layer 520 through a transcription process using the pattern layer 514.

The cover layer 530 protects the organic insulation layer 520. In one exemplary embodiment, the cover layer 530 includes polyethylene terephthalate and is formed to have a thickness of about 25 μm.

Hereinafter, a method of manufacturing a display substrate using an organic insulation layer sheet is described.

FIGS. 6 to 10 are cross-sectional views illustrating an exemplary embodiment of a method of manufacturing a display substrate in accordance with the present invention.

Referring to FIGS. 1 to 6, a pixel layer 220 includes pixel parts 221 having a matrix shape and the pixel layer 220 is formed on a transparent substrate 210. In an exemplary embodiment, a first metal layer is formed on the transparent substrate 210. A gate line 222 and a gate electrode G are formed on the first metal layer. In an exemplary embodiment, the gate line 222 and the gate electrode G may be formed by performing a photo process and an etching process on the first metal layer.

The gate line 222 defines an upper side and a lower side of the pixel part 221 in FIG. 1. The gate electrode G is connected to the gate line 222 and serves as a gate terminal of the thin-film transistor 225.

A gate insulation layer 223 is formed on the transparent substrate 210 where the gate line 222 and the gate electrode G are formed. In one exemplary embodiment, the gate insulation layer 223 includes a silicon nitride layer or a silicon oxide layer and the gate insulation layer 223 is formed to have a thickness of about 4500 Å.

After an amorphous silicon layer and an amorphous silicon layer heavily doped with n-type impurities are formed on the gate insulation layer 223, an active layer 227 is formed on the gate insulation layer 223 corresponding to the gate electrode G. In an exemplary embodiment, the active layer 227 may be formed on the gate insulation layer 223 by a photo process and an etching process.

The active layer 227 includes a semiconductor layer 227A and an ohmic contact layer 227B. The semiconductor layer 227A may include amorphous silicon. The ohmic contact layer 227B may include amorphous silicon highly doped with n-type impurity.

After a second metal layer is formed on the gate insulation layer 223 and the active layer 227, a data line 224, a source electrode S and a drain electrode D are formed. The data line 224, the source electrode S and the drain electrode D may be formed by a photo process and an etching process.

The data line 224 defines a left side and a right side of the pixel part 221 in FIG. 1. The source electrode S is connected to the data line 224 and serves as a source terminal of the thin-film transistor 225. The drain electrode D is separated from the source electrode S and serves as a drain terminal of the thin-film transistor 225.

Sequentially, the ohmic contact layer 227B positioned between the source electrode S and the drain electrode D is removed and the semiconductor layer 227A is exposed. The ohmic contact layer 227B may be removed by etching.

A passivation layer 226 is formed on the gate insulation layer 223 where the data line 224, the source electrode S and the drain electrode D are formed. In one exemplary embodiment, the passivation layer 226 includes a silicon nitride layer or a silicon oxide layer and is formed to have a thickness of about 2000 Å.

Figure 7:
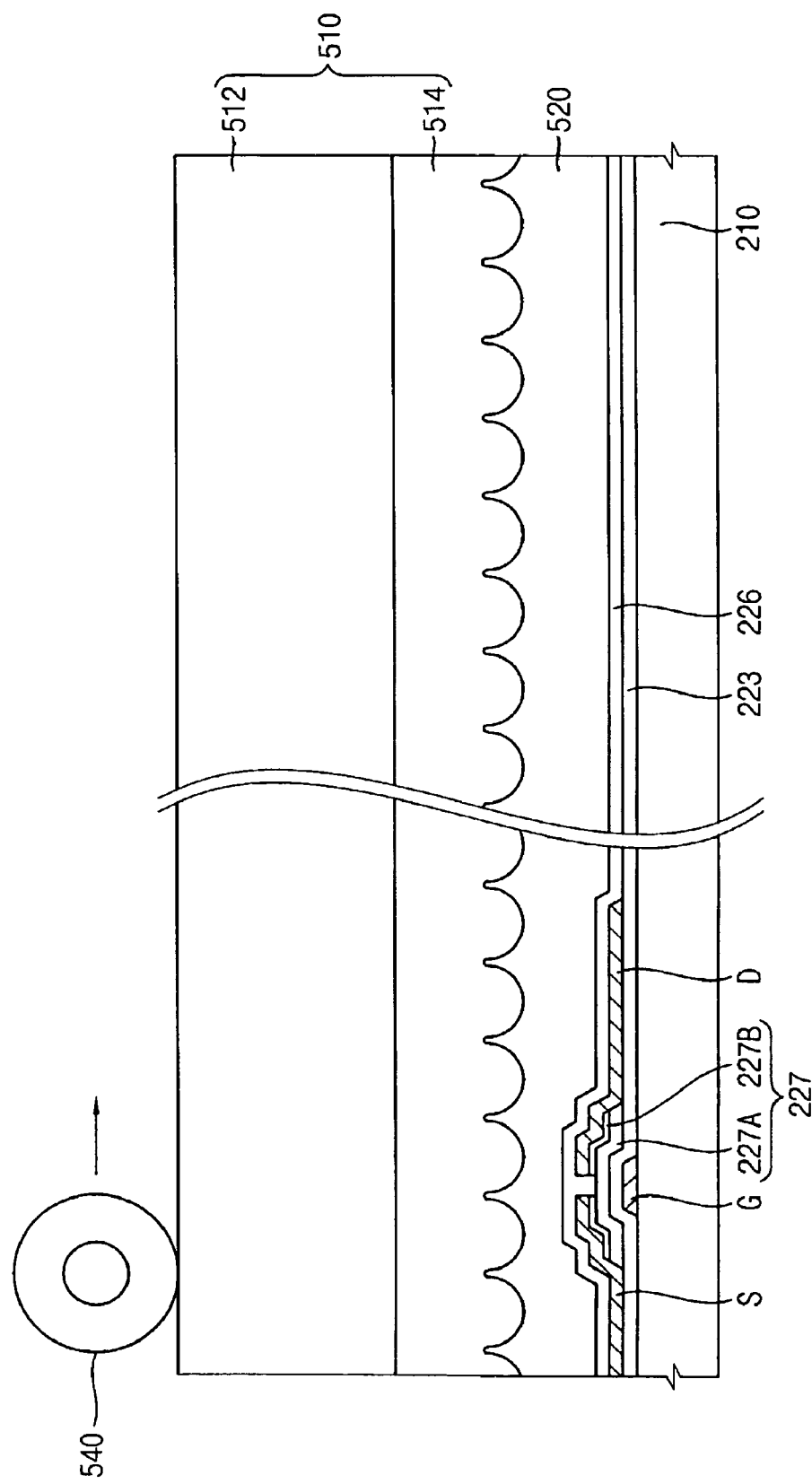

Referring to FIG. 7, an organic insulation layer sheet 500 is disposed on the transparent substrate 210 where the pixel layer 220 is formed. As illustrated in FIG. 5, the organic insulation sheet 500, of which the cover layer 530 is removed, is disposed on the transparent substrate 210 such that an organic insulation layer 520 contacts the pixel layer 220.

The organic insulation layer sheet 500 is laminated on the pixel layer 220. Laminating the organic insulation layer sheet 500 may be performed by a rolling process using a roller 540. In an exemplary embodiment, a temperature of the roller 540 is in a range of about 100° C. to about 140° C.

Figure 8:
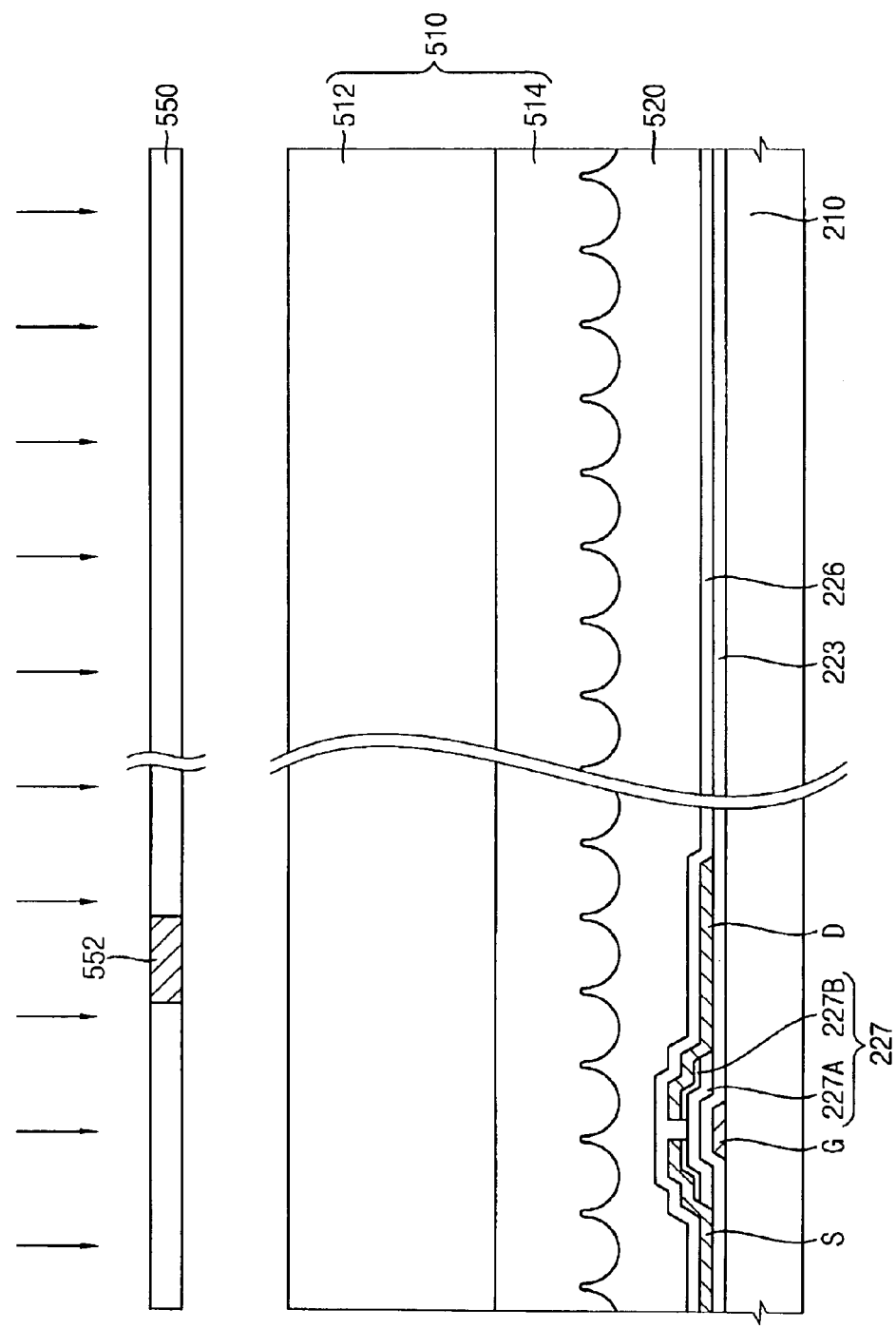

Referring to FIG. 8, the organic insulation layer 520 is exposed after the organic insulation layer sheet is laminated on the pixel layer 220. To pattern the organic insulation layer 520, after a mask 550 having a predetermined pattern is disposed over the organic insulation layer 520, an exposing light is irradiated onto the organic insulation layer sheet 500. The mask 550 includes a pattern part 552 to transmit or shade an exposing light. As in the illustrated embodiment, the mask 550 is disposed for the pattern part 552 to correspond to a position of a contact hole in FIG. 2.

Figure 9:
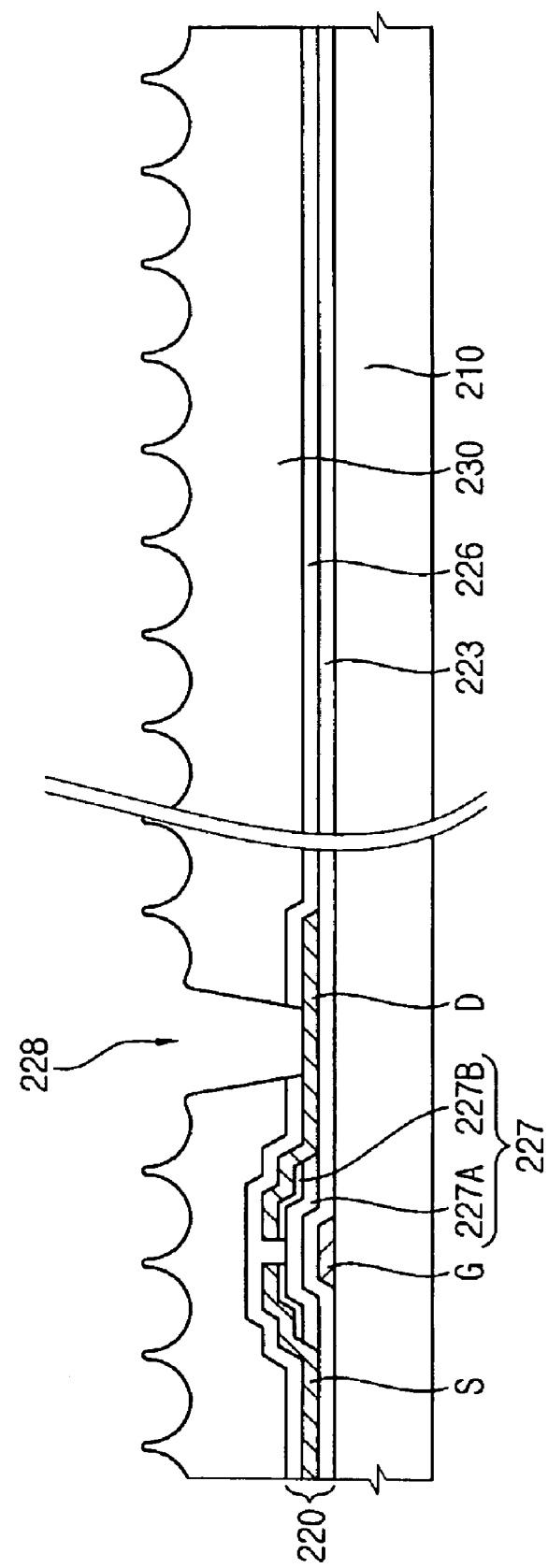

Referring to FIG. 9, a base layer 510 of the organic insulation layer 500 is removed after the organic insulation layer 520 is exposed.

An organic insulation layer 230 is formed on the transparent substrate 210 by developing the organic insulation layer 520 remaining on the pixel layer 220. Here, portions of the organic insulation layer 520 and the passivation layer 226 that are not exposed by the pattern part 552 of the mask 550 are removed to form a contact hole A microlens pattern 232 is ultimately formed on an upper face of the organic insulation layer 230. In exemplary embodiments, the microlens pattern 232 has a depth of no less than about 1.5 μm. In one exemplary embodiment, the microlens pattern 232 has a depth of about 1.5 μm to 2.8 μm to increase a reflexibility and to improve a visual angle.

By forming the organic insulation layer 230 using the organic insulation layer sheet 500 having a standardized microlens pattern 232, a thickness variation according to a position of the organic insulation layer 230 may be decreased and the microlens pattern 232 may be precisely manufactured.

As described above, when the organic insulation layer 230 is formed through the organic insulation layer sheet 500, a thickness-irregularity of a conventional organic insulation layer, which is formed through a spin coating method, may be solved.

Figure 10:
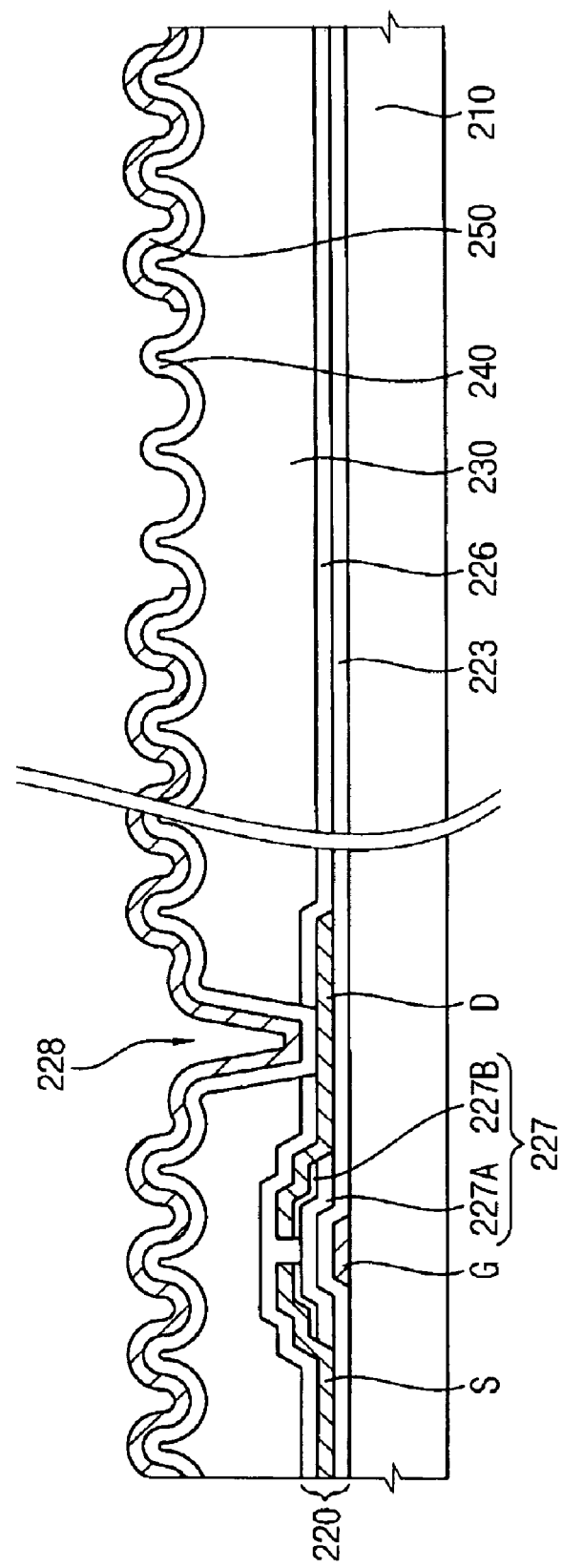

Referring to FIGS. 1 and 10, a transparent electrode 240 may be formed to correspond to etched pixel part 221 by a photo process and an etching process after a transparent conductive layer is formed on the organic insulation layer 230.

The transparent electrode 240 may include a transparent conductive material to transmit a light. In one exemplary embodiment, the transparent electrode 240 includes indium zinc oxide or indium tin oxide.

The transparent electrode 240 is electrically connected to the drain electrode D of the thin-film transistor 225 through the contact hole 228 formed on the organic insulation layer 230 and the passivation layer 226.

After a metal layer having a high reflexibility of a light is formed on the transparent electrode 240, a reflective electrode 250 is formed. In exemplary embodiments, the reflective electrode may be formed by performing a photo process and an etching process on the metal layer. The reflective electrode 250 may include a conductive material having a high reflexibility of a light. In one exemplary embodiment, the reflective electrode 250 includes a single reflective layer or a double reflective layer. The single reflective layer may include, but is not limited to, an aluminum niodium layer. The double reflective layer may include, but is not limited to, an aluminum niodium layer and a molybdenum tungsten layer.

The reflective electrode 250 is partially formed on the transparent electrode 240 to define a reflective region RR and a transmissive region TR. The reflective region RR is a region where the reflective electrode 250 exists and the transmissive region TR is a region where the reflective electrode 250 is removed and the transparent electrode 240 is exposed.

The transparent electrode 240 and the reflective electrode 250 are substantially uniformly formed on the organic insulation layer 230 so that the transparent electrode 240 and the reflective electrode 250 have substantially the same surface construction as that of the organic insulation layer 230. The reflective electrode 250 has substantially the same depth as that of the microlens pattern 232 of the organic insulation layer 230.

In the illustrated exemplary embodiments, a microlens pattern 232 having a depth of no less than about 1.5 μm is formed on an organic insulation layer so that a reflexibility may be increased and a visual angle may be improved.

In an exemplary embodiment, the organic insulation layer is formed using the organic insulation layer sheet having a standardized microlens pattern, a thickness variation according to a position of the organic insulation layer may be decreased and the microlens pattern may be precisely manufactured.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A display substrate comprising:
   a transparent substrate;
   a pixel layer formed on the transparent substrate, the pixel layer comprising pixel parts having a matrix shape;
   an organic insulation layer formed on the pixel layer, the organic insulation layer comprising a microlens pattern having a depth of no less than about 1.5 micrometers (μm) formed on an upper portion of the organic insulation layer;
   a transparent electrode formed on the organic insulation layer; and
   a reflective electrode partially formed on the transparent electrode and defining a reflective region and a transmissive region,
   wherein heights of the organic insulation layer at a centeral region and a periphery region of the transparent substrate are substantially same.

2. The display substrate of claim 1, wherein the microlens pattern has a depth of about 1.5 μm to about 2.8 μm.

3. The display substrate of claim 1, wherein the microlens pattern comprises concave microlenses having a diameter of no more than about 13.6 μm.

4. The display substrate of claim 1, wherein the pixel layer comprises:
   gate lines formed on the transparent substrate, the gate lines defining an upper side and a lower side of a pixel part;
   a gate insulation layer formed on the transparent substrate where the gate lines are formed;
   data lines formed on the gate insulation layer, the data lines defining a left side and a right side of the pixel part;
   a thin-film transistor formed in the pixel part and connected to a gate line and a data line; and
   a passivation layer formed on the gate insulation layer where the data lines and the thin-film transistor are formed.

5. The display substrate of claim 4, wherein the thin-film transistor comprises:
   a gate electrode connected to the gate line;
   an active layer formed on the gate insulation layer, corresponding to the gate electrode;
   a source electrode formed on the active layer and connected to the data line; and
   a drain electrode formed on the active layer to be spaced apart from the source electrode, the drain electrode connected to the transparent electrode through a contact hole that is formed through the passivation layer and the organic insulation layer.

6. A method of manufacturing a display substrate comprising:
   forming a pixel layer comprising pixel parts having a matrix shape on a transparent substrate;

forming an organic insulating layer on the pixel layer using an organic insulating sheet, the organic insulation layer comprising a microlens pattern that has a depth of no less than about 1.5 μm;

forming a transparent electrode on the organic insulation layer; and partially forming a reflective electrode on the transparent electrode to define a reflective region and a transmissive region.

7. The method of claim 6, wherein the organic insulation sheet comprises:
   a base layer including a base film and a pattern layer with an embossing pattern corresponding to the microlens pattern;
   an organic layer formed on the pattern layer; and
   a cover layer protecting the organic layer.

8. The method of claim 7, wherein the forming an organic insulation layer further comprises:
   disposing the organic insulation layer sheet with the cover layer being removed on the transparent substrate where the pixel layer is formed;
   laminating the organic insulation layer sheet on the pixel layer;
   patterning the organic insulation layer; and
   removing the base layer.

9. The method of claim 8, wherein laminating the organic insulation layer sheet on the pixel layer comprises a rolling process using a roller at a temperature of about 100° C. to 140° C.

10. The method of claim 7, wherein the organic insulation layer comprises acryl-based photosensitive resin.

11. The method of claim 7, wherein the base film comprises polyethylene terephthalate and wherein the pattern layer includes acryl-based resin.

12. The method of claim 6, wherein the microlens pattern has a depth of about 1.5 μm to about 2.8 μm.

13. The method of claim 6, wherein the microlens pattern comprises concave microlenses having a diameter of no more than about 13.6 μm.

14. The method of claim 6, wherein the forming a pixel layer comprises:
   forming gate lines on the transparent substrate to define an upper side and a lower side of the pixel part;
   forming a gate insulation layer on the transparent substrate where the gate lines are formed;
   forming data lines on the gate insulation layer to define a left side and a right side of the pixel part;
   forming a thin-film transistor connected to the gate line and the data line in the pixel part; and
   forming a passivation layer on the gate insulation layer where the data lines and the thin-film transistor are formed.

15. The method of claim 14, wherein the forming a thin-film transistor comprises:
   forming a gate electrode connected to a gate line;
   forming an active layer on the gate insulation layer, corresponding to the gate electrode;
   forming a source electrode connected to a data line on the active layer; and
   forming a drain electrode on the active layer to be spaced apart from the source electrode, the drain electrode connected to the transparent electrode through a contact hole that is formed through the passivation layer and the organic insulation layer.

16. A display device comprising:
   a display substrate comprising an organic insulation layer including a microlens pattern having a depth of no less than about 1.5 micrometers (μm), a transparent electrode formed on the organic insulation layer and a reflective electrode partially formed on the transparent electrode to define a reflective region and a transmissive region;
   an opposite substrate facing the display substrate; and
   a liquid crystal layer interposed between the display substrate and the opposite substrate,
   wherein heights of the organic insulation layer at a centeral region and a periphery region of the display substrate are substantially same.

17. The display device of claim 16, wherein the microlens pattern has a depth of about 1.5 μm to about 2.8 μm.

18. The display device of claim 16, wherein the opposite substrate comprises:
   a color filter layer to realize a color; and
   a common electrode formed on the color filter layer to face the display substrate.

19. The display device of claim 16, wherein the reflective electrode has substantially the same depth as the microlens pattern.

* * * * *